US007561398B2

(12) United States Patent
Hung

(10) Patent No.: US 7,561,398 B2
(45) Date of Patent: Jul. 14, 2009

(54) ANTI-SURGE POWER ADAPTER

(76) Inventor: Kwongyee Hung, Room 10-11, 6/F, Kwong Sang Hong Centre, 151-153 Hoi Bun Road, Kwun Tong, Kowloon, Hong Kong (CN)

( * ) Notice: Subject to any disclaimer, the term of this patent is extended or adjusted under 35 U.S.C. 154(b) by 126 days.

(21) Appl. No.: 11/567,403

(22) Filed: Dec. 6, 2006

(65) Prior Publication Data

US 2008/0137241 A1 Jun. 12, 2008

(51) Int. Cl.
*H02H 7/20* (2006.01)
*H02H 1/00* (2006.01)

(52) U.S. Cl. ...................................... 361/112; 361/117

(58) Field of Classification Search ................. 361/112, 361/117
See application file for complete search history.

(56) References Cited

U.S. PATENT DOCUMENTS 1,768,779 A * 7/1930 Niemann .................... 378/117
3,743,884 A * 7/1973 Wafer et al. ................... 361/16
3,911,322 A * 10/1975 Engel et al. ................. 361/120
4,586,105 A * 4/1986 Lippmann et al. ........... 361/117
4,939,618 A * 7/1990 Fingerson et al. ........... 361/117
5,130,880 A * 7/1992 Puri ............................ 361/35
6,097,262 A * 8/2000 Combellack ................. 333/12
6,510,034 B2 * 1/2003 Palinkas et al. ............. 361/119
6,859,351 B2 * 2/2005 Byrne et al. ................ 361/220
6,937,454 B2 * 8/2005 Mikolajczak et al. ....... 361/111
7,161,784 B2 * 1/2007 Cheung et al. .............. 361/111
2003/0035365 A1 * 2/2003 Jurdi et al. .................. 370/201

* cited by examiner

*Primary Examiner*—Ronald W Leja
(74) *Attorney, Agent, or Firm*—Global IP Services; Tianhua Gu

(57) ABSTRACT

An anti-surge power adapter comprising: a transformer; a pair of copper sheets which, with a certain gap between themselves, is connected between said transformer and the power input terminal or on the said transformer to release instantaneous surge. The present invention features low cost, simple process and high reliability, and only requires two copper sheets or a PCB or other insulating board with copper sheets to be connected in the circuitry. The anti-surge power adapter uses copper sheets to release instantaneous high voltage, features quick response and can withstand an instantaneous high voltage of 6-17 KV. This invention is applicable to linear or switching power adapter.

3 Claims, 2 Drawing Sheets

ANTI-SURGE POWER ADAPTER

FIELD OF THE INVENTION

Certain embodiments of the invention relate to a power adapter. More specifically, certain embodiments of the invention relate to an anti-surge power adapter.

BACKGROUND OF THE INVENTION

At present, most lightning-proof power suppliers apply paralleled surge absorbers (voltage dependent resistor) (as shown in FIG. 1) to prevent surges, but the surge absorbers are restricted by their bearing capacity and unstable (such as respond slowly and will be invalid after withstanding several surge voltage). They usually can only withstand a surge voltage of 5-8 KV. And surge absorbers are encumbered by their large volume and high cost. Another way to prevent surge is to thicken the paint film of the primary coil of the transformer (shown as T in FIG. 1), wrap tape and sheath around the starting wire and the ending wire, for example. This method has complicated processes, high cost and poor reliability, and can only withstand 10 KV in the lightning test.

SUMMARY OF THE INVENTION

The present invention is to provide an anti-surge power adapter, which features simple processes, low cost, and high reliability and can withstand an instantaneous voltage of 6-17 KV.

According to an aspect of the invention, an anti-surge power adapter is provided, the anti-surge power adapter comprising a transformer; a pair of copper sheets having a certain gap between them being connected between said transformer and a power input terminal or on said transformer for releasing instantaneous surge.

Advantageously, said pair of copper sheets respectively connect with the live wire and the null line of said power supply.

Advantageously, said pair of copper sheets respectively connect with the primary coil and the secondary coil of said transformer.

Advantageously, said transformer is connected with said power input terminal by a common mode chokes, and the anti-surge power adapter also comprises a second pair of copper sheets for releasing instantaneous surge, the first pair of copper sheets is connected with one coil of said common mode chokes in parallel, the second pair of copper sheets is connected with the other coil of said common mode chokes in parallel.

Advantageously, said pair of copper sheets is arranged in symmetric serration.

Advantageously, said copper sheets are attached on a PCB.

The present invention features low cost, simple process and high reliability, and only requires two copper sheets or a PCB or other insulating board with copper sheets to be connected in the circuitry. The anti-surge power adapter uses copper sheets to release instantaneous high voltage, features quick response and can withstand an instantaneous high voltage of 6-17 KV. This invention is applicable to linear or switching power adapter.

DETAILED DESCRIPTION OF THE INVENTION

These and other advantages, aspects and novel features of the present invention, as well as details of an illustrated embodiment thereof, will be more fully understood from the description and drawings.

Figure 1:
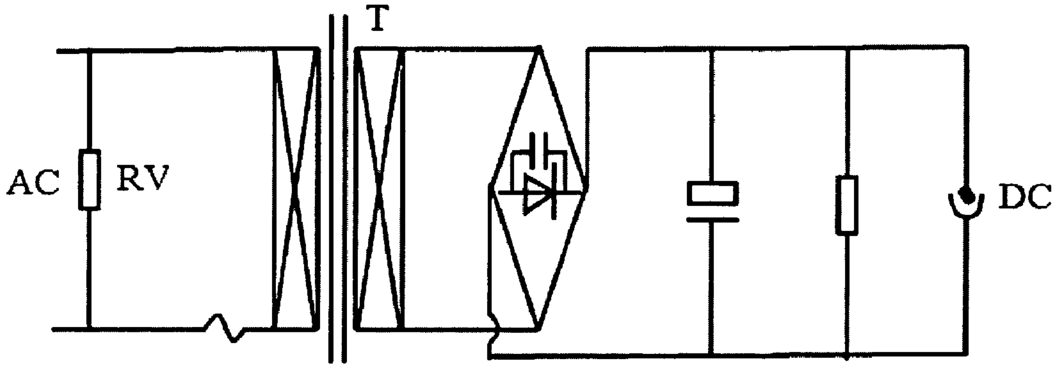
Figure 1 (Prior Art)
FIG. 1 is a circuitry structural schematic of a power adapter described in the background of the invention.
Figure 2:
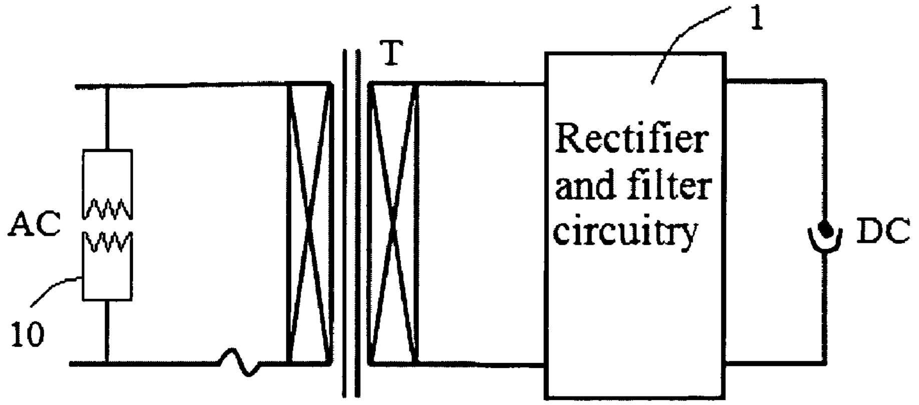
FIG. 2 is a circuitry structural schematic of an anti-surge power adapter, in accordance with an embodiment of the present invention.

The present invention can be an anti-surge power adapter applicable to various electric apparatus. It can simply consist of copper sheets 10 for releasing instantaneous surge and following elements connected in sequence: AC power input terminals, a transformer (T), rectifier and filter circuitry 1 and DC output terminals (as shown in FIG. 2); and can also be a more complicated power adapter consisting of copper sheets 10 and following elements connected in sequence: AC power input terminals, a first rectifier and filter circuitry 2, a control circuitry 3, a transformer (T), a second rectifier and filter circuitry 4 and DC output terminals (as shown in FIG. 4).

Figure 3:
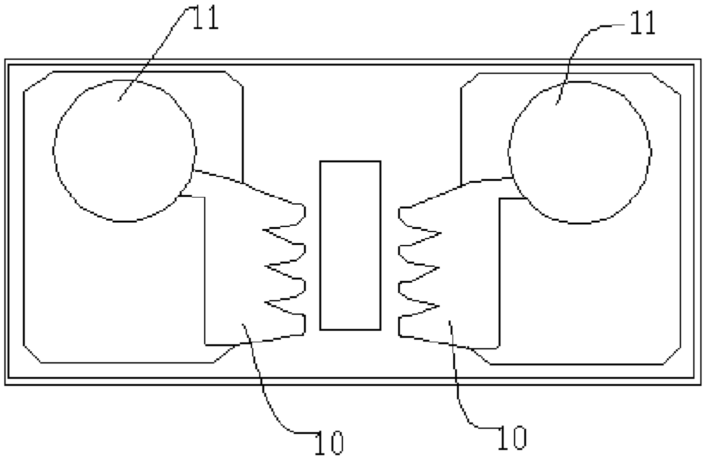
FIG. 3 is a structural schematic of a PCB attached with a pair of copper sheets, in accordance with an embodiment of the present invention.

FIG. 2 is a circuitry structural schematic of an anti-surge power adapter, in accordance with an embodiment of the present invention. An anti-surge power adapter comprises two copper sheets 10 to release instantaneous surge attached on a PCB, wherein the two copper sheets 10 connect with two solder joints on the PCB, through which the two copper sheets respectively connect to the live wire and the null line of the AC power supply. As shown in FIG. 3, the two copper sheets 10 are arranged in a symmetric serration and maintain a certain distance between them, wherein the distance is determined by their locations in the circuitry and the specific parameters of the circuitry. When the copper sheets 10 needs to withstand high voltage, the distance between will be reduced with minimum of 2.0 mm, otherwise the distance will be increased. Thus when the circuitry is confronted with high voltage (for example, lightning), it can discharge through the two copper sheets 10 to protect power supply and electric equipments connected.

Figure 4:
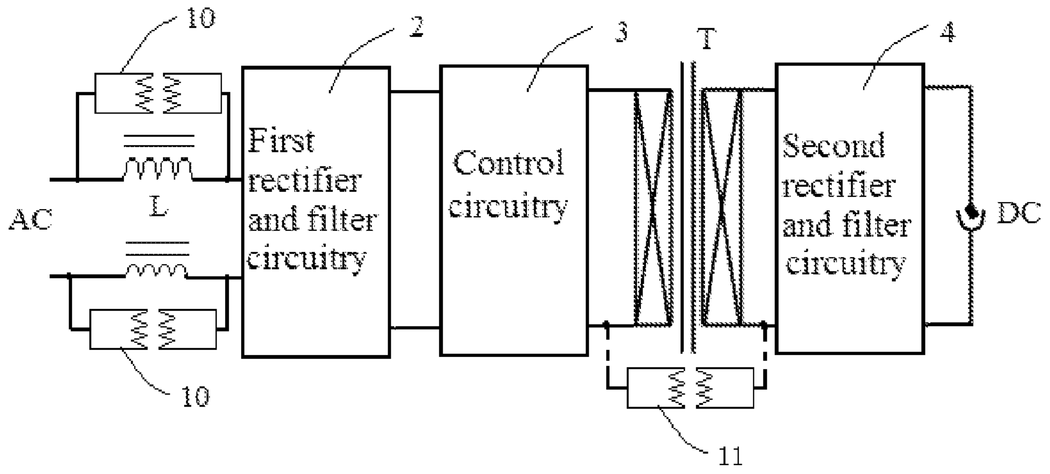
FIG. 4 is the circuitry structural schematic illustrating another anti-surge power adapter, in accordance with an embodiment of the present invention.

FIG. 4 is the circuitry structural schematic illustrating another anti-surge power adapter, in accordance with an embodiment of the present invention. An anti-surge power adapter comprises sequentially connected AC power input terminals, a first rectifier and filer circuitry 2, a control circuitry 3, a transformer T, a second rectifier and filter circuitry 4 and DC output terminals, wherein a common mode choke L is connected in series between the AC power input terminal and the first rectifier and filter circuitry 2. To achieve anti-surge function, two pairs of copper sheets 10 similar to the copper sheets 10 in FIG. 3 are connected respectively between the two poles of each of the two coils of the common mode choke L, wherein one copper sheet of a pair connects with a pin of a coil of the common mode choke L and the other copper sheet of the pair connects with the other pin of the coil of the common mode choke L; one copper sheet of the other pair connects with a pin of the other coil of the common mode choke L and the other copper sheet of this pair connects with the other pin of the coil of the common mode choke L. Thus it can improve the instantaneous high voltage resistance performance and antistatic performance. The two pairs of copper sheets can be attached on one PCB, or respectively on two PCBs or directly connected between the two poles of the common mode choke.

In another embodiment, an anti-surge power adapter (the same as the circuitry structural schematic as shown in FIG. 4) comprises sequentially connected AC power input terminals, a first rectifier and filer circuitry 2, a control circuitry 3, a transformer T, a second rectifier and filter circuitry 4 and DC output terminals. A pair of copper sheets 11 attached on a PCB is connected between the primary and the secondary coils of the transformer T, wherein one copper sheet connects with the input terminal of the primary coil of the transformer T and the other copper sheet connects with the output terminal of the secondary coil of the transformer T. Thus it can improve the instantaneous high voltage resistance performance and antistatic performance.

In other embodiments of the invention, according to actual circuitry structure of the power adapter, copper sheets 10 for releasing instantaneous surge may be connected between the live wire and the null line, between two poles of the common mode choke L and between the primary and secondary coils of the transformer T simultaneously, or any two of the above said three locations.

In other embodiments of the invention, copper sheets 10 of other shapes and sizes can be used, but are preferentially arranged in symmetric serration to achieve fast discharge. In other embodiments of the invention, the copper sheets 10 are not necessarily attached on the PCB but to be directly connected in the circuitry. In other embodiments of the invention, the copper sheets 10 can be connected on other insulating boards or insulating elements.

According to the above description, the present invention provides an anti-surge power adapter which utilizes copper sheets or copper sheets attached on PCB or on other insulation boards to discharge instantaneous high voltage. While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An anti-surge power adapter comprising:

a transformer;

a pair of copper sheets being connected between said transformer and a power input terminal for releasing instantaneous surge, each copper sheet has a serrate end with a plurality of teeth, the two copper sheets are arranged symmetrically to set the two serrate ends in confrontation with a gap therein, thereby multiple pairs of discharge electrodes are formed;

wherein the anti-surge power adapter further comprises a choke that is connected in series between the transformer and the power input terminal and a second pair of copper sheets, two pins of a first coil of said coke are connected with the two sheets of said pair of copper sheets respectively, and two pins of a second coil of said coke are connected with the two sheets of said second pair of copper sheets respectively.

2. The anti-surge power adapter of claim 1, wherein said copper sheets are attached on a PCB.

3. The anti-surge power adapter of claim 1, wherein the gap is 2.0 mm at least when the copper sheets need to withstand high voltage.

* * * * *